R.H. BARNARD
F.T. NESBITT
J.P. BENOIT
C.W. SCHREIBER
J.E. McLAUGHLIN
INVENTORS

BY Rule & Hoge
ATTORNEYS.

Nov. 3, 1942.     R. H. BARNARD ET AL     2,300,862
APPARATUS FOR MANUFACTURING HOLLOW GLASS ARTICLES
Filed Dec. 19, 1938     7 Sheets-Sheet 3

R.H. BARNARD
F.T. NESBITT
J.P. BENOIT
C.W. SCHREIBER
J.E. McLAUGHLIN.
INVENTORS.

BY Rule & Hoge
ATTORNEYS.

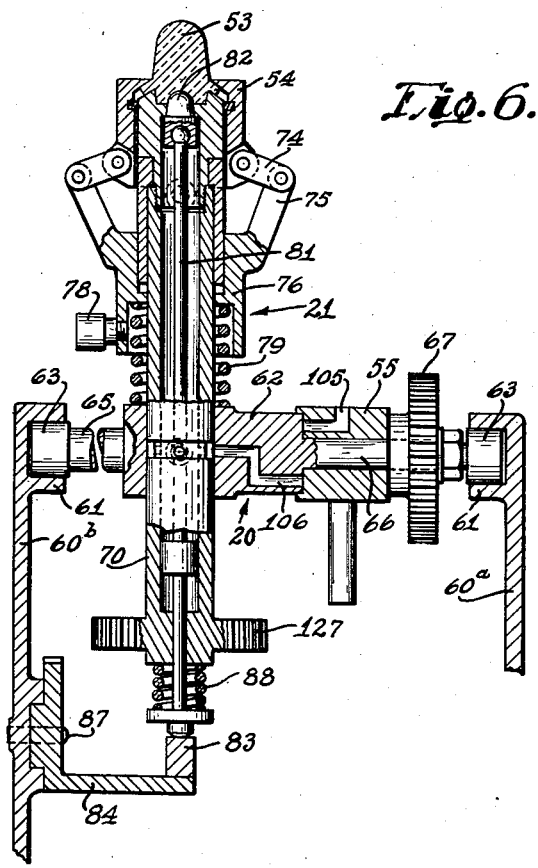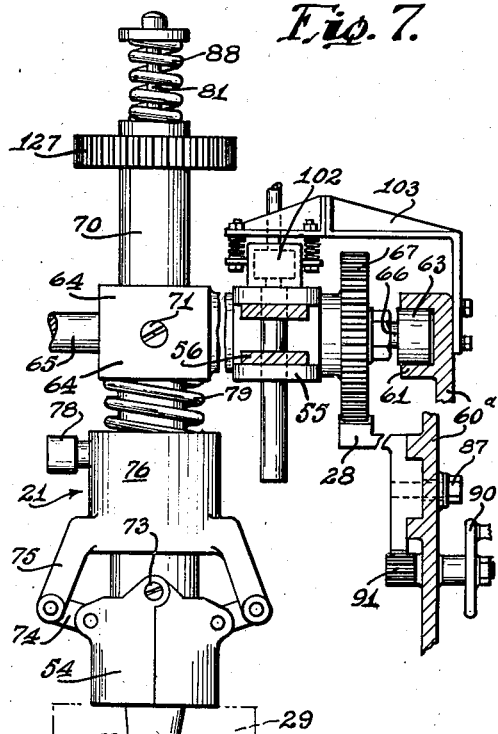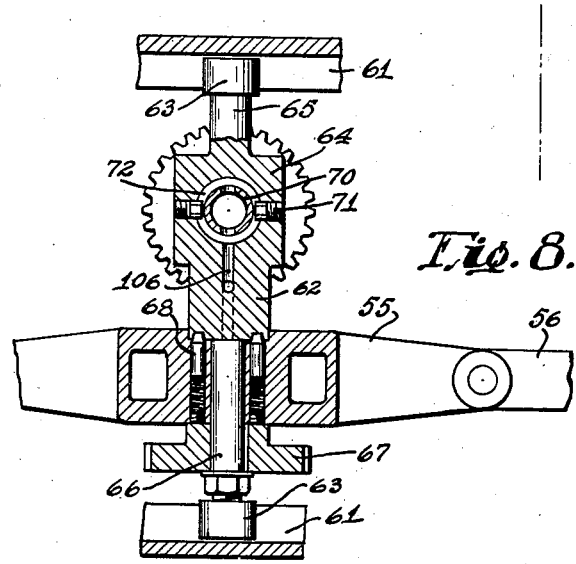

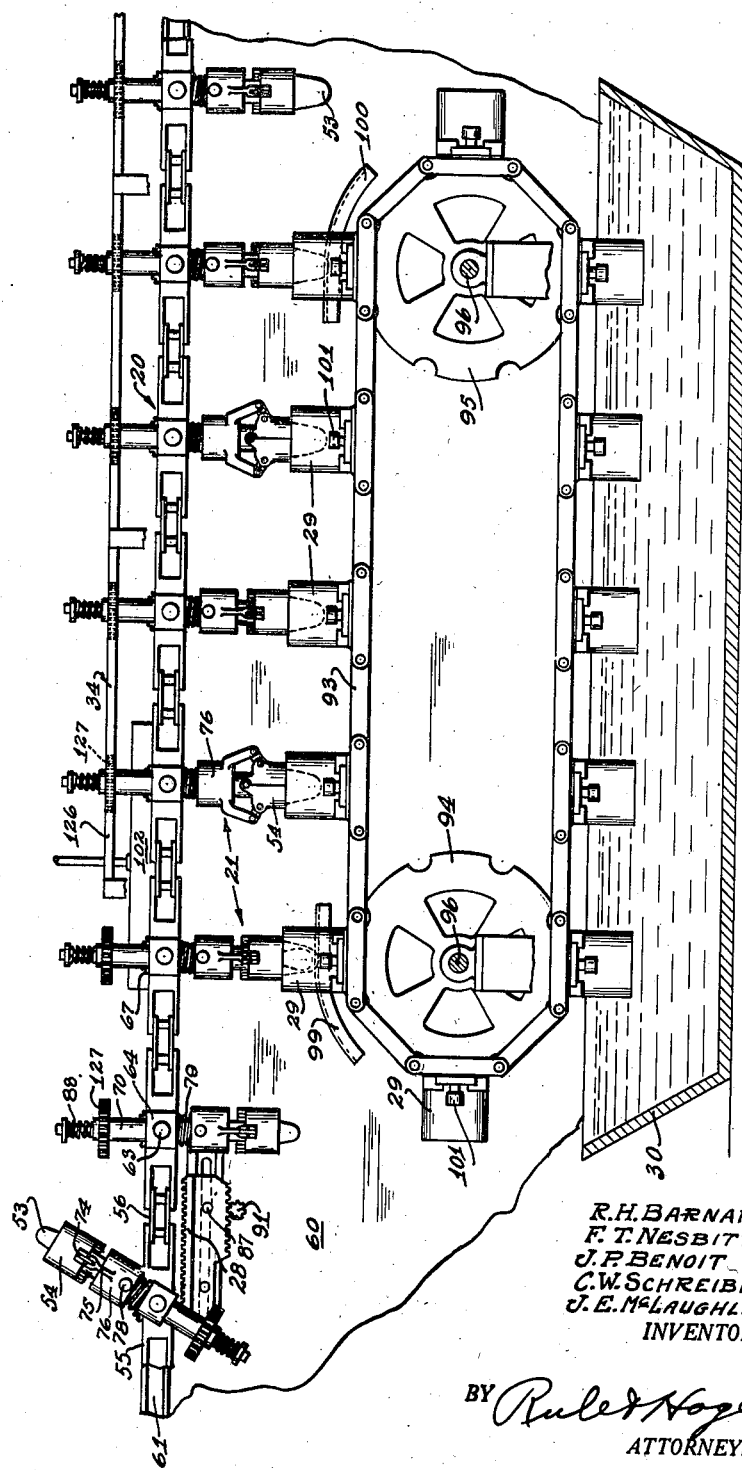

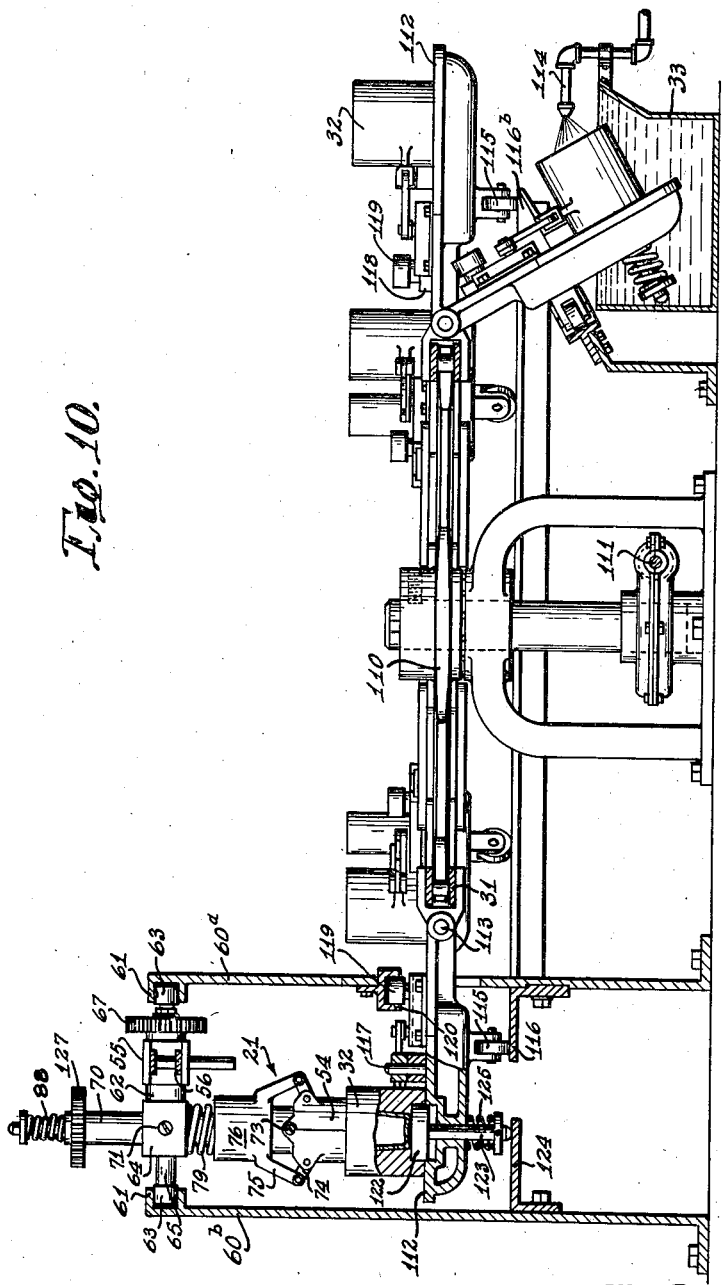

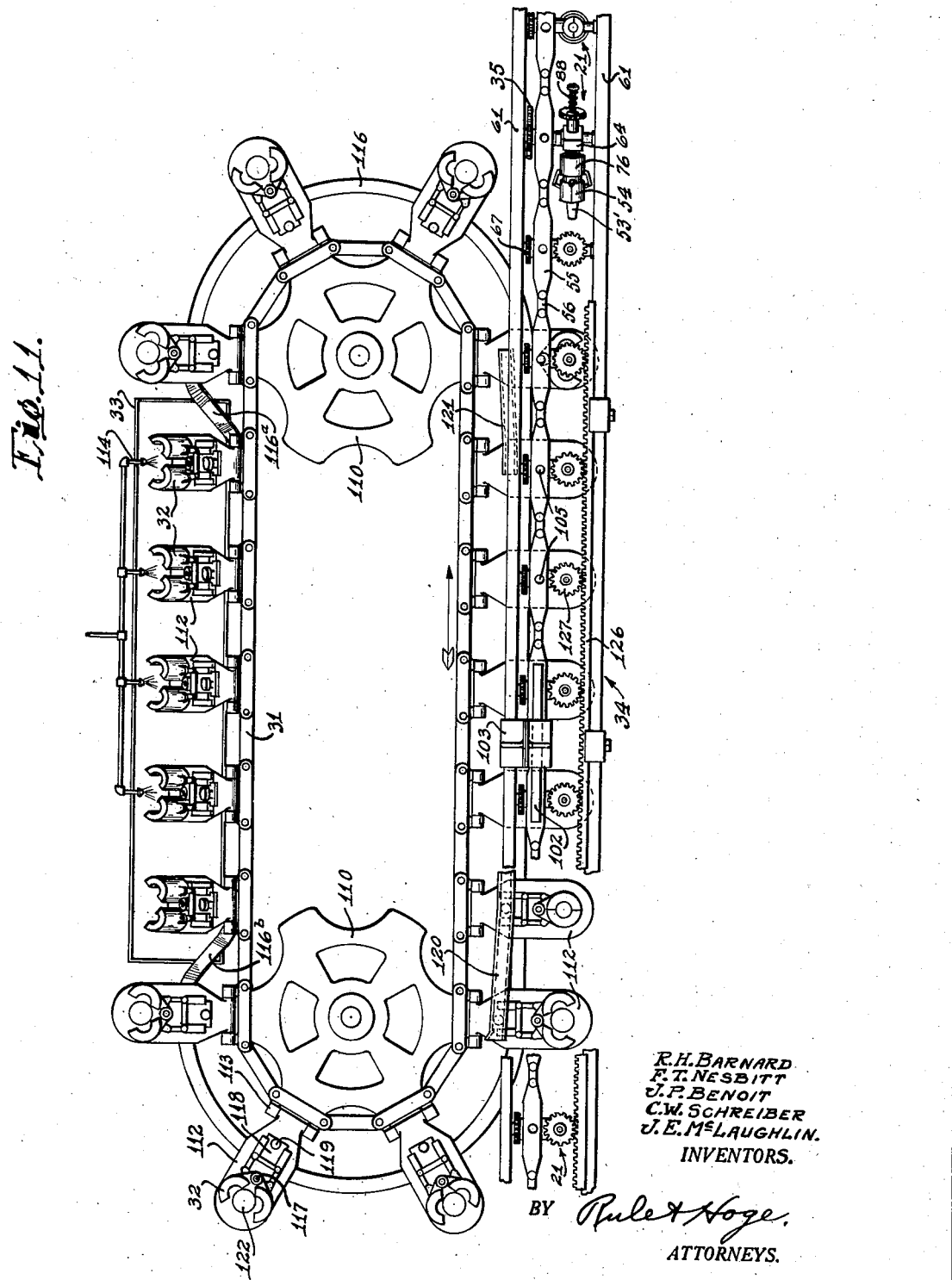

Patented Nov. 3, 1942

2,300,862

UNITED STATES PATENT OFFICE 2,300,862

APPARATUS FOR MANUFACTURING HOLLOW GLASS ARTICLES

Randolph H. Barnard, Frank T. Nesbitt, and Carl W. Schreiber, Toledo, Ohio, and Joseph P. Benoit and John E. McLaughlin, Alton, Ill., assignors to Owen-Illinois Glass Company, a corporation of Ohio Application December 19, 1938, Serial No. 246,588

18 Claims. (Cl. 49—5)

Our invention relates to apparatus for making tumblers, jars, bottles and other hollow glass articles. The invention in its preferred form is embodied in apparatus of the type in which charges of molten glass are gathered by suction into a blank mold or molds which may be projected periodically by means of a ram into the forehearth of a furnace tank or other container for a supply of molten glass from which the charges are drawn by suction into the molds. The blanks thus formed are transferred to spindles carried on an endless conveyor. The blanks are expanded by means of air under pressure supplied through the spindles, the blanks being partially developed in the open, then introduced into intermediate or secondary molds in which further expanding of the blanks takes place and then transferred, while still carried on the spindles, to finishing molds in which the articles are blown to final form. Means are provided for then burning off or severing the moil.

An object of our invention is to provide a novel form of such apparatus which is simple in construction and at the same time adapted to have a large output. More specifically, an object of the invention is to provide an apparatus of the type above indicated in which the blanks are transferred from the gathering molds to spindles on an endless conveyor and in which the intermediate molds and finishing molds respectively are carried on separate endless conveyors and arranged to travel in register with the spindles while the blanks are being developed therein.

Other objects of the invention will appear hereinafter.

Referring to the accompanying drawings:

Fig. 4 is a fragmentary plan view showing a portion of the spindle conveyor, spindles, and means for inverting and for rotating the spindles;

Fig. 5 is a vertical section at the line 5—5 on Fig. 4, showing an inverted spindle and a secondary mold in register therewith;

Fig. 6 is a part sectional elevation of a spindle unit;

Fig. 7 is an elevation view of the same with the spindle inverted;

Fig. 8 is a fragmentary sectional plan view showing a spindle and its conveyor;

Fig. 9 is a fragmentary sectional elevation showing the intermediate mold group and spindles in register with the molds and also showing spindle inverting mechanism;

Fig. 10 is a sectional elevation view of the finishing mold group and a spindle in register with one of the finishing molds; and Fig. 11 is a plan view of the finishing mold group and a portion of the spindle conveyor mechanism.

Figure 1:
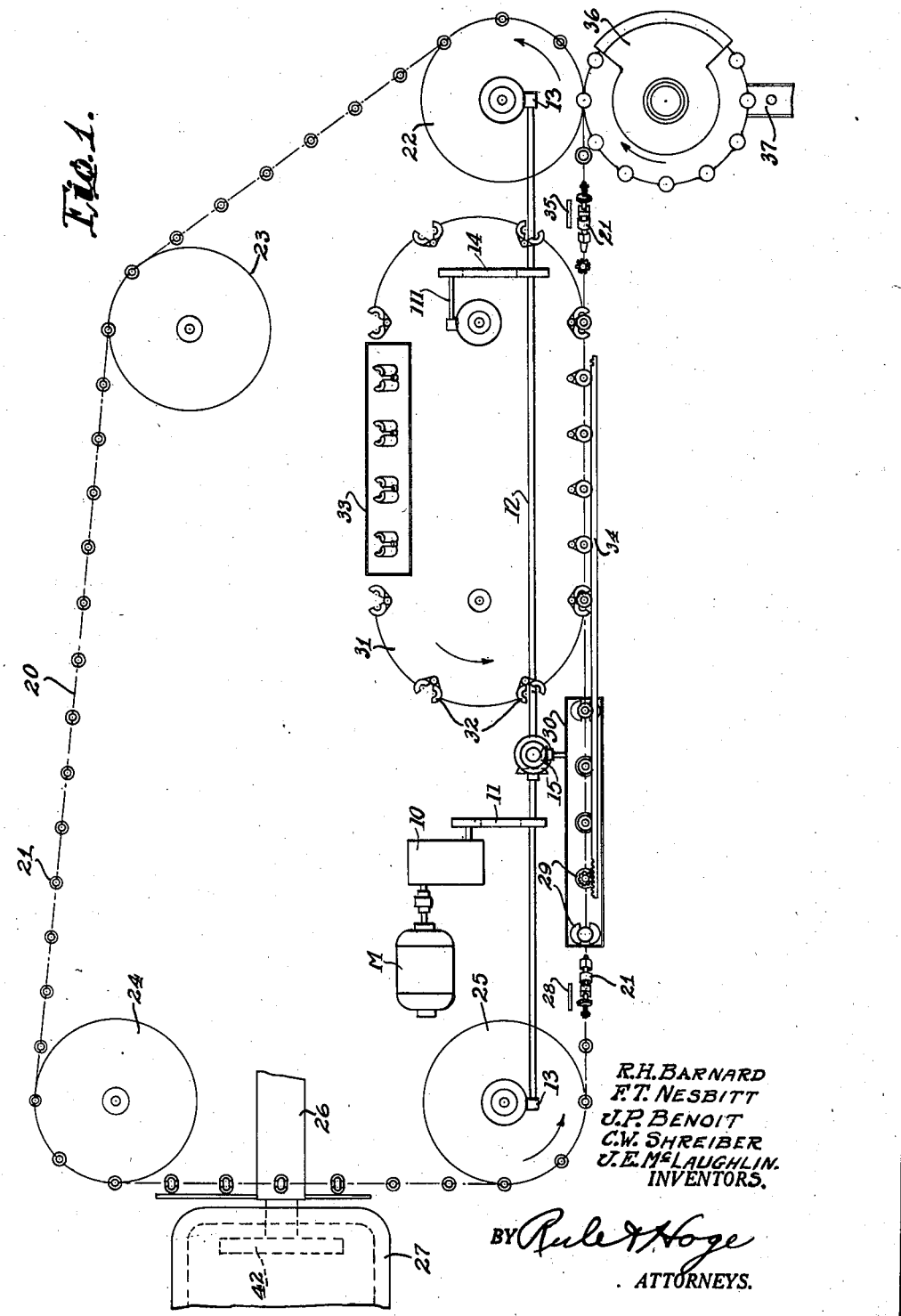
Fig. 1 is a diagrammatic plan view of apparatus constructed in accordance with the present invention.

The general arrangement of the apparatus is shown diagrammatically in Fig. 1. Such apparatus includes a spindle conveyor 20 made up of bars or links connected to form an endless chain, each link supporting a spindle unit comprising a spindle 21; sprocket wheels 22, 23, 24 and 25 over which the conveyor is trained to travel continuously in a horizontal path; a ram 26 by which a battery of gathering molds is projected into a furnace forehearth 27 for gathering charges of glass which are delivered to the spindles 21; a turn-over device 28 by which spindles are inverted; an intermediate mold group comprising intermediate or semi-blow molds 29 carried on an endless conveyor by means of which the molds are caused to register and travel with the spindles while the blanks are expanded therein, a cooling tank 30 for the molds 29; a finishing mold conveyor 31; finishing molds 32 carried thereby in which the blanks are blown to finished form; a cooling tank 33 for the finishing molds; spinning means 34 for spinning the blanks; a turn-over device 35 by which the spindles are reinverted; a burn-off mechanism 36 for burning off the moil; and a conveyor 37 by which the articles may be transferred to an annealing leer.

The means for driving the spindle conveyor and the conveyors for the intermediate and finishing molds may comprise a motor M having driving connection, through speed reduction gearing within a gear box 10 and a sprocket chain or belt 11, with a line shaft 12. The line shaft has driving connection through worm gearing 13 with the sprocket wheels 22 and 25 for driving the spindle conveyor. A sprocket chain 14 provides driving connection from the line shaft to a drive shaft 111 (hereinafter mentioned) for driving the finishing mold conveyor. The endless conveyor for the intermediate molds 29 is driven from the line shaft through a train of gearing 15. The above mentioned gearing interconnects the several endless conveyors and is so arranged and proportioned that the intermediate and finishing molds are caused to register with the spindles 21 and travel therewith through predetermined distances, all as more fully hereinafter set forth.

Figure 2:
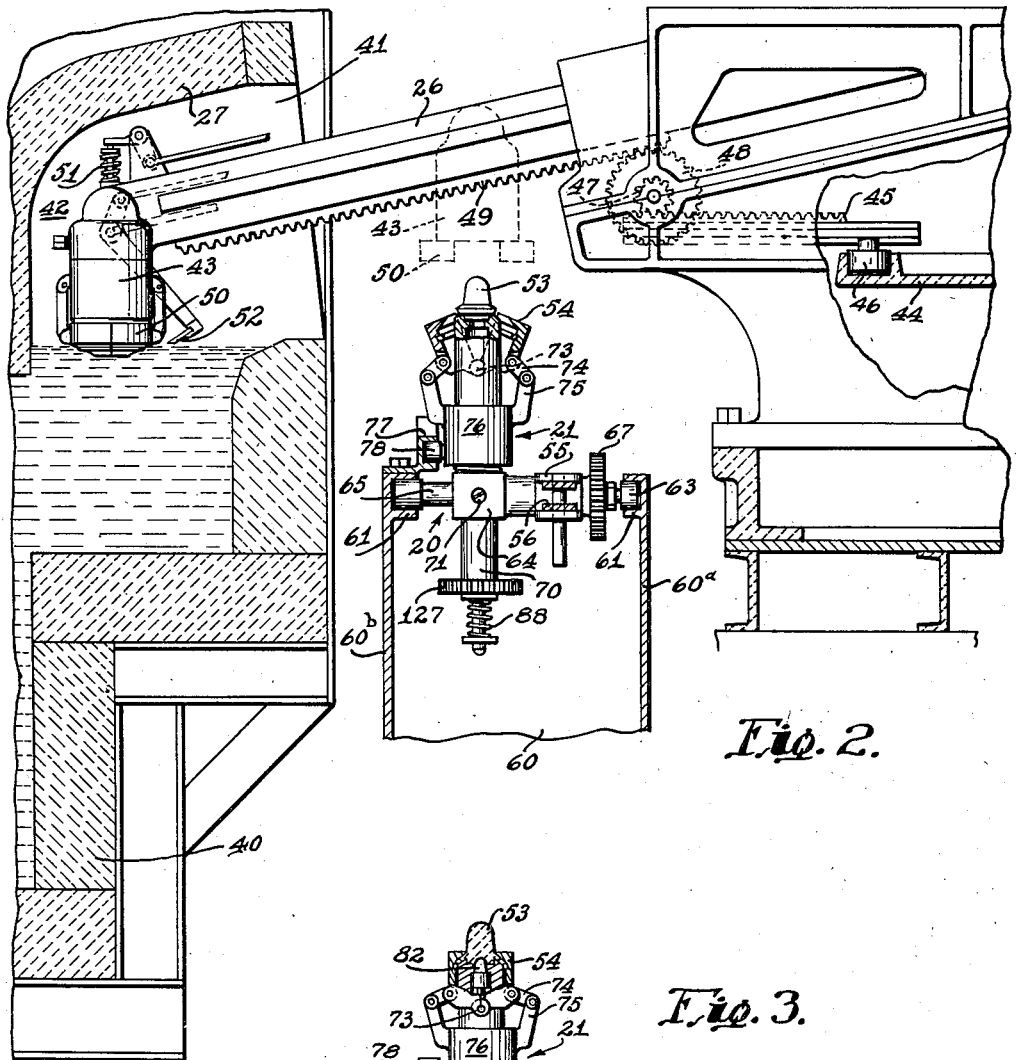
Fig. 2 is a fragmentary sectional elevation showing a gathering ram projected into a tank forehearth for gathering charges of glass, operating mechanism for the ram, and a spindle to which a blank has been transferred from a gathering mold.
Figure 3:
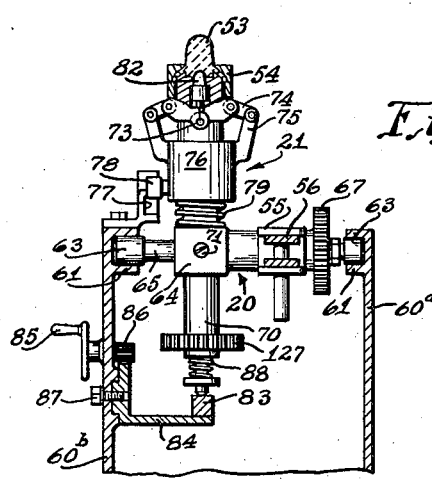
Fig. 3 is a part sectional elevation of a spindle and associated parts.

Molten glass is supplied from a furnace tank 40 (Fig. 2), the forehearth 27 of which is provided with an opening 41. The ram 26 is formed with a multiple head 42 carrying a plurality of gathering molds 43. The ram is periodically reciprocated lengthwise for projecting the molds through the opening 41 into position to gather charges of glass. Any suitable mechanism may be provided for reciprocating the ram, such mechanism as herein shown including a cam 44 which may be rotated continuously. A rack bar 45 carries a cam roll 46 engaging the cam and actuated thereby for reciprocating the rack bar. The latter has a driving connection through gear pinions 47 and 48 with a rack 49 on the ram.

The gathering molds 43 and their operating mechanism may be of conventional construction, each said mold comprising separable sections 50. When the molds are projected into the forehearth, charges of glass are gathered therein by suction controlled by valve mechanism 51. When the molds have gathered their charges, the ram is withdrawn and a knife 52 operates to sever the charges. When the ram is retracted, the molds 43 are brought to the dotted line position (Fig. 2) directly over the spindles 21. The mold sections 50 are then separated and the vacuum released, permitting the mold charges or gobs 53 to drop onto the spindles and to be gripped by a pair of jaws 54 actuated by mechanism as hereinafter described.

The spindle conveyor 20 comprises an endless series of spindle supporting links or bars 55, each of which supports a spindle unit. The bars 55 are connected by links 56 which engage sprockets 57 on the sprocket wheels 22, 23, 24 and 25. The spindle conveyor is supported in a frame 60 (see Figs. 4 and 5) comprising side plates 60ª, 60ᵇ, formed along their upper edges with horizontally disposed channels 61. Each spindle unit comprises a horizontal shaft 62 extending between the frame plates 60ª and 60ᵇ and having rolls 63 on each end of the shaft arranged to run in the tracks formed by the channels 61. Each spindle carrying shaft 62 (see Figs. 2 to 7) comprises an intermediate section 64 and reduced end portions or stems 65 and 66 on which the rolls 63 are mounted.

The stem 66 extends through a bore in the link 55, permitting rotation of the shaft 62 for inverting and reinverting the spindle. Keyed to the stem 66 is a gear wheel 67 which, during the travel of the spindle, periodically engages rack bars for effecting the inverting and reinverting movements as (Fig. 8) hereinafter described. A pair of spring actuated detents 68 mounted in the link 55 engage corresponding recesses in the shaft 62 when the spindle is in its vertical positions, thereby centering and holding the spindle steady in both its inverted and reinverted positions.

The spindle 21 comprises a hollow shaft 70 extending through an opening in the shaft 62 and journalled for rotation therein. Endwise movement of the spindle in the shaft is prevented by means of a pair of studs 71, threaded into the shaft section 64 and engaging an annular groove 72 in the spindle. The jaws 54 are mounted to swing about pivots 73 and are connected through links 74 to arms 75 on a sleeve member 76 which is mounted for up and down movement on the shaft 70 for closing and opening the jaws. This movement of the jaws is effected by a stationary cam 77 (Figs. 2 and 3) which engages a cam roll 78 on the sleeve 76. The jaws are moved to their closed or gripping position by a coil spring 79 mounted on the spindle shaft and held under compression between the sleeve 76 and the shaft 62. As the spindle advances to its charge-receiving position (Fig. 2), the roll 78 engages the cam 77 and opens the jaws. When the mold charge or parison 53 has been dropped onto the spindle, the roll 78 passes beyond the cam and permits the spring 79 to close the jaws and thereby grip the parison.

A plunger rod 81 extends within and lengthwise of the spindle shaft 70 and is provided at its upper end with a plunger tip 82. The plunger rod extends downward (Fig. 6) beyond the spindle shaft into position to be actuated by a stationary cam 83 for projecting the plunger tip into the parison 53, thereby forming an initial blow opening in the parison. The cam 83 (see Figs. 3 and 6) is carried on a bracket 84 mounted for horizontal movement on the frame plate 60ᵇ for adjusting the position of the cam. Such adjustment is effected by means of a hand crank 85 connected to a pinion 86 engaging rack teeth on the bracket 84. A set screw 87 holds the bracket and cam in adjusted position. A coil spring 88 holds the plunger tip in its retracted position when the plunger rod is released from the cam 83.

After the plunger has received its parison 53 and advanced to a predetermined position, the spindle is inverted from the Fig. 6 position to the Fig. 7 position, thereby swinging the parison downward preparatory to being enclosed within a semi-blow mold 29. This inverting movement is caused by engagement of the gear 67 with the stationary rack 28 (Figs. 1, 4 and 7). The rack 28 has a mounting on the frame plate 60ª permitting horizontal adjustment, effected by means of a hand wheel 90 operating a rack and pinion 91.

The intermediate mold group comprises a series of semi-blow molds 29 (Figs. 1, 5, 9) mounted on a pair of parallel spaced endless chains 93 trained over sprocket wheels 94 and 95 mounted for rotation on horizontal shafts 96. Each mold 29 (see Fig. 5) is split in a vertical plane parallel with its direction of movement, thereby providing partible sections. Said sections are slidably mounted on a plate or support 97 forming a part of the chain conveyor. The mold sections are held together by a coil spring 98 but may be separated by means of pairs of stationary cams 99 and 100 which engage cam rolls 101 carried by the mold sections. As shown in Fig. 9, the cams 99 are positioned to open each mold 29 as it is brought beneath and in register with a spindle 21, thereby permitting the parison carried by said spindle to be positioned between the open mold sections. The mold then passes beyond the cams 99 and is closed by means of the spring 98. The parison is then blown to hollow form within the mold.

The means for blowing the parisons comprises a wind box or air pressure chamber 102 (Figs. 4 and 5). Air under pressure is supplied to said box from any suitable source (not shown) and a continuous air pressure may be maintained therein. The box 102 is carried on a stationary bracket 103 and is held with a yielding downward pressure by means of springs 104, against the upper faces of the spindle carrying links 55 as the latter advance therebeneath. As each link 55 passes beneath the wind box, a series of openings in the bottom of the box are brought in succession into register with a port 105 in the link. A channel 106 in the shaft 62, is in communication with the port 105 when the spindle is swung down to the Fig. 5 position, the channel 106 (see Figs. 7 and 8) being in communication with the interior of the spindle shaft 70. Air under pressure is thus supplied to the parison 53 and expands it to hollow form within the mold. The air may be supplied as a series of puffs of greater or less duration, the length and frequency of such application being determined by the arrangement of the openings in the pressure chamber 102. The parison is retained in the mold for a predetermined length of time after the blowing operation. The mold is then opened by the cams 100 (Fig. 9) leaving the bare parison suspended from the spindle.

The finishing mold group, as shown in detail in Figs. 10 and 11, comprises the partible finishing molds 32 arranged in an endless series connected to the chain conveyor 31, trained over horizontally disposed sprocket wheels 110. Driving means for the conveyor may include a drive shaft 111 connected through speed reduction gearing to one of the sprocket wheel shafts. Each finishing mold is mounted on an arm 112 in the form of a table or plate having a hinge connection 113 with the conveyor chain which permits the mold to be swung downwardly from its normal position in which the plate is horizontal, to an inclined position as shown at the right-hand end of Fig. 10 for cooling purposes. In this latter position the mold is partially immersed in a cooling bath in the tank 33. A nozzle 114 may also be used to project a spray of cooling liquid against the interior walls of the mold. Each mold carrying arm 112 carries a roll 115 which runs on a cam track 116 by which the arm is supported throughout its travel. The track 116 includes inclined portions 116ª and 116ᵇ which control the lowering and lifting movements respectively of the molds as they enter and leave the tank 33.

Each finishing mold comprises partible sections mounted to swing about a hinge pin 117. A slide block 118 operatively connected to the mold sections carries a cam roll 119 adapted to run on a stationary cam 120 for closing the mold and a stationary cam 121 for opening the mold. A mold bottom 122 is provided for each mold, said mold bottom having a stem 123 extending downward through the arm 112 in position to be engaged by a cam 124 for lifting the mold bottom against the force of a spring 125.

The finishing mold conveyor 31 is driven at the same linear speed as the spindle conveyor and in synchronism therewith. As shown in Fig. 1, the finishing molds are arranged to be brought into register with the spindles and to advance therewith, each mold as it advances with a spindle being closed around the parison which has been partially developed in the intermediate mold 29.

The blank spinning mechanism 34 (Figs. 4, 5, 11) comprises a stationary rack 126 arranged to engage gears 127 carried by the spindle shafts 70 so as to rotate each spindle as it travels along the rack. The spinning of the blank may be continued through any desired portion of the development of the parison. As herein shown, the blank is rotated both while in the intermediate mold 29 and while in the finishing mold 32, paste molds being employed to permit the rotation of the parisons therein.

After a blown blank has passed beyond its finishing mold, the spindle by which it is carried is reinverted by the turn-over mechanism 35 (Fig. 1), said mechanism comprising a rack bar to engage the gears 67. This reinverting of the spindle swings the blown article upward and turns it to the inverted position. The article is then transferred to a burn-off mechanism.

We claim:

1. Apparatus for forming hollow glass articles comprising a series of spindles, an endless chain conveyor for the spindles, means for driving and guiding said conveyor and thereby causing the spindles to travel in a horizontal closed path, said means comprising sprocket wheels rotatable about parallel, horizontally spaced axes, means for supplying charges of molten glass to the spindles, and means for developing said charges to the form of hollow articles while carried by the spindles.

2. Apparatus for forming hollow glass articles comprising a series of spindles, an endless chain conveyor for the spindles, means for driving and guiding said conveyor and thereby causing the spindles to travel in a horizontal closed path, said means comprising a plurality of sprocket wheels mounted to rotate about vertical axes, means for supplying charges of molten glass to the spindles, and means for developing said charges to the form of hollow articles while carried by the spindles.

3. In apparatus for forming hollow glass articles, the combination of an endless chain conveyor mounted to travel in a horizontal closed path, sprocket wheels over which the conveyor is trained, said wheels mounted for rotation about parallel, horizontally spaced axes, and a series of spindles connected to travel with said conveyor, said spindles including means for holding charges of glass, and means cooperating with the spindles for developing said charges into articles of predetermined shape.

4. In apparatus for forming hollow glass articles, the combination of an endless chain conveyor mounted to travel in a horizontal closed path, sprocket wheels over which the conveyor is trained, said wheels mounted for rotation about parallel, horizontally spaced axes, and a series of spindles connected to travel with said conveyor, said spindles including means for holding charges of glass, means for inverting and reinverting the spindles, and means cooperating with the spindles for developing said charges into articles of predetermined shape.

5. In apparatus for forming hollow glass articles, the combination of an endless chain conveyor mounted to travel in a horizontal closed path, sprocket wheels over which the conveyor is trained, said wheels mounted for rotation about parallel, horizontally spaced axes, and a series of spindles connected to travel with said conveyor, said spindles including means for holding charges of glass, automatic means for rotating the spindles in succession about horizontal axes and thereby inverting the spindles seriatim, and means cooperating with the spindles for developing said charges into articles of predetermined shape.

6. In apparatus for forming hollow glass articles, the combination of an endless chain conveyor mounted to travel in a horizontal closed path, sprocket wheels over which the conveyor is trained, said wheels mounted for rotation about parallel, horizontally spaced axes, and a series of spindles connected to travel with said conveyor, said spindles including means for holding charges of glass, automatic means for rotating each spindle about a horizontal axis extending through the spindle when the latter reaches a predetermined position in its travel with the conveyor, and means cooperating with the spindles for developing said charges into articles of predetermined shape.

7. Apparatus for forming glass articles comprising an endless spindle conveyor traveling in a closed path, spindles carried by said conveyor, finishing molds, intermediate molds, an endless conveyor on which the intermediate molds are mounted and by which they are caused to register with the spindles and travel in register therewith a predetermined distance, means for supplying parisons of glass to the spindles, means for blowing the parisons in said intermediate molds, and means for thereafter blowing the parisons in the finishing molds while supported on the spindles.

8. The combination of an endless spindle carrier, spindles thereon, an endless finishing mold carrier, finishing molds thereon, an endless intermediate mold carrier, intermediate molds thereon, means for driving the spindle carrier, means for supplying parisons of glass to the spindles, means for causing the intermediate molds and the finishing molds to register with the spindles and travel therewith through predetermined distances, and means for blowing the parisons in said intermediate molds and finishing molds.

9. In apparatus for forming hollow glass articles, the combination of an endless spindle conveyor, spindles carried thereby, said conveyor mounted to travel in a horizontal closed path, an endless finishing mold conveyor mounted to travel in a horizontal closed path, finishing molds on said last mentioned conveyor arranged to travel in register with the spindles through a predetermined distance, an endless mold conveyor mounted to travel continuously in a closed path in a vertical plane, and molds on said last mentioned conveyor arranged to register with the spindles and travel therewith a predetermined distance.

10. Apparatus for forming glass articles, comprising a spindle conveyor including horizontally disposed bars linked together to form an endless chain, spindles individual to said bars, means providing a pivotal connection between the spindles and said bars, permitting the spindles to swing about horizontal pivots, and automatic means for swinging said spindles about said pivots and thereby inverting the spindles during their travel with the conveyor.

11. Apparatus for forming glass articles, comprising a spindle conveyor including horizontally disposed bars connected to form an endless chain and mounted to travel in a horizontal closed path, horizontal shafts individual to said bars, and extending transversely thereof, said shafts mounted for rotation about their axes, spindles carried by and rotatable with said shafts, and automatic means for rotating said shafts and thereby inverting and reinverting the spindles during their travel with the conveyor.

12. Apparatus for forming glass articles, comprising a spindle conveyor including horizontally disposed bars connected to form an endless chain and mounted to travel in a horizontal closed path, horizontal shafts individual to said bars and extending transversely thereof, said shafts mounted for rotation about their axes, spindles carried by and rotatable with said shafts, automatic means for rotating said shafts and thereby inverting and reinverting the spindles during their travel with the conveyor, and automatic means for rotating the spindles about their longitudinal axes.

13. Apparatus for forming glass articles comprising a spindle conveyor including a series of bars connected to form an endless chain, shafts individual to said bars extending transversely thereof and journalled in said bars for rotation about their axes, a stationary supporting frame for the conveyor including horizontal tracks, rolls on said shafts running in said tracks, and spindles carried by said shafts.

14. Apparatus for forming glass articles comprising a spindle conveyor including a series of bars connected to form an endless chain, shafts individual to said bars extending transversely thereof and journalled in said bars for travel with the conveyor and for rotation about their axes, a stationary supporting frame for the conveyor including horizontal tracks, rolls on said shafts running in said tracks, vertically disposed spindles connected to said shafts, and automatic means for periodically rotating said shafts at predetermined points during their travel with the conveyor and thereby inverting the spindles.

15. Apparatus for forming glass articles comprising a spindle conveyor, including a series of bars extending lengthwise of the conveyor and connected to form an endless chain, spindle holding shafts traveling with the conveyor, said shafts extending transversely of said bars and journalled therein, spindles carried by said shafts and traveling therewith, gears on said shafts, and a stationary rack for engaging said gears and rotating the shafts to invert the spindles during the travel of the latter through a predetermined zone.

16. Apparatus for forming glass articles comprising a spindle conveyor including a series of bars extending lengthwise of the conveyor and connected to form an endless chain, spindle holding shafts traveling with the conveyor, said shafts extending transversely of said bars and journalled therein, spindles carried by said shafts and traveling therewith, gears on said shafts, a stationary rack for engaging said gears and rotating the shafts to invert the spindles during the travel of the latter through a predetermined zone, and spring detents carried by said bars and releasably engaging said shafts for holding the spindles when the said gears have passed beyond the control of said rack.

17. In apparatus for forming glass articles, the combination of an endless chain conveyor, a series of molds mounted on the conveyor to travel therewith in an endless path, each said mold comprising mold sections mounted for bodily movement to and from each other in a straight line perpendicular to their direction of travel with the conveyor for closing and opening the mold, automatic means for effecting said opening of the molds, including stationary cams and cam rolls attached directly to the mold sections and running on said cams, and automatic means for closing the molds when released from the cams.

18. The combination of an endless spindle carrier traveling in a closed path, spindles thereon, means for supplying parisons of glass to the spindles, finishing molds, an endless finishing mold carrier on which the finishing molds are mounted and by which they are caused to register with the spindles and travel therewith a predetermined distance, intermediate molds, an endless intermediate mold carrier, on which the intermediate molds are mounted and by which they are caused to travel in register with the spindles through a predetermined distance, and means for blowing the parisons in said intermediate molds and finishing molds.

RANDOLPH H. BARNARD.
FRANK T. NESBITT.
CARL W. SCHREIBER.
JOSEPH P. BENOIT.
JOHN E. McLAUGHLIN.